E. R. BEEMAN & T. BRENNAN, Jr.
GRAIN DRILL.
APPLICATION FILED MAY 16, 1910.
1,061,517.
Patented May 13, 1913.
2 SHEETS—SHEET 1.
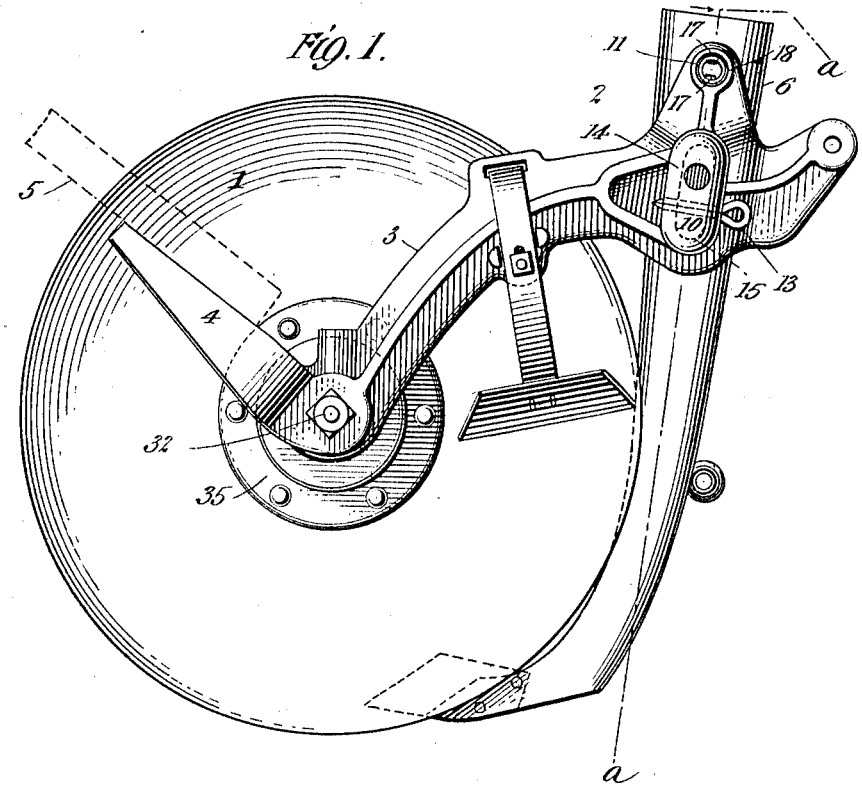
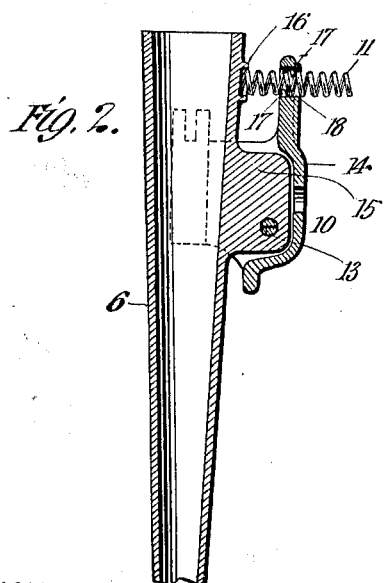

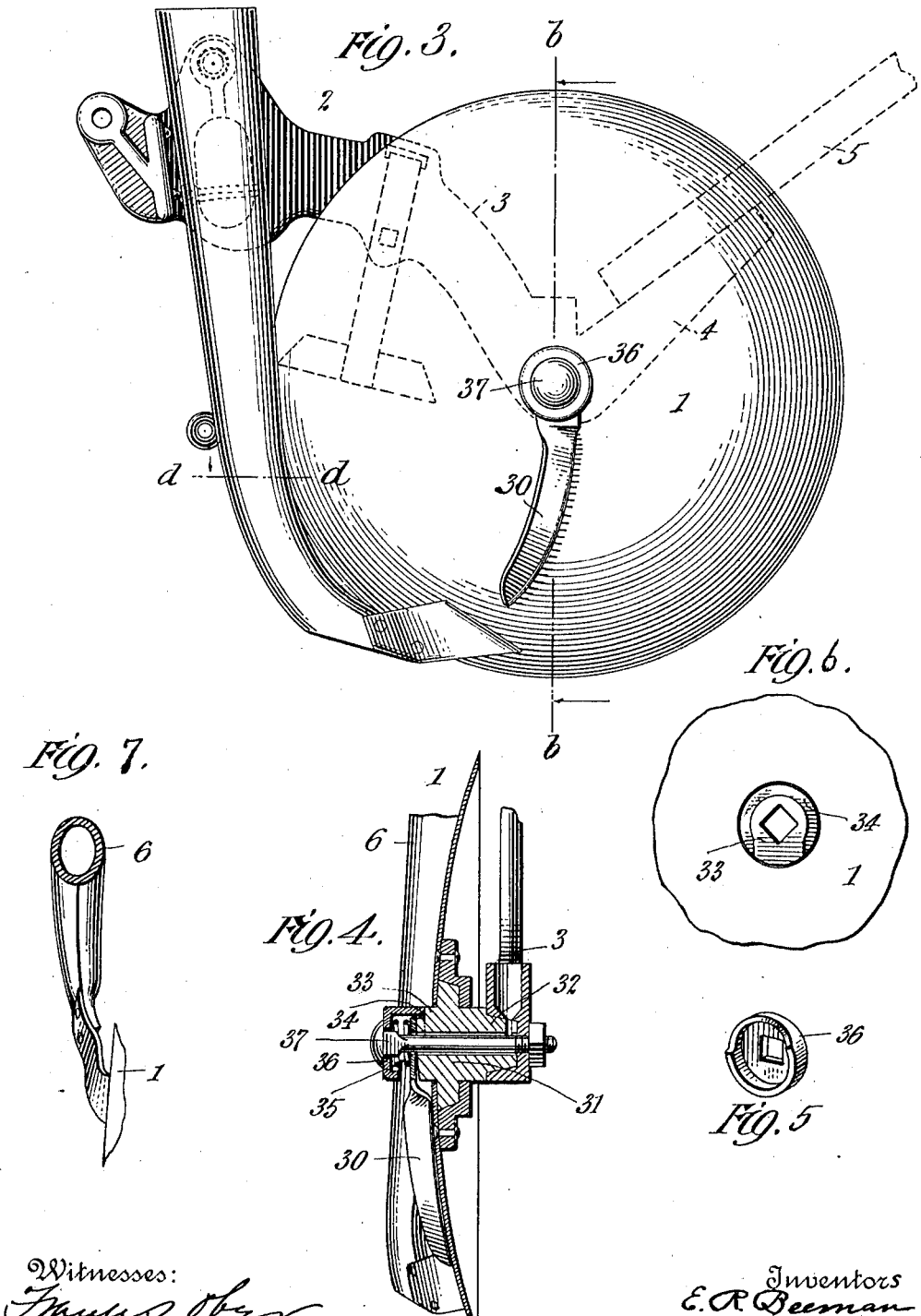

UNITED STATES PATENT OFFICE.

EDWIN R. BEEMAN, OF MINNEAPOLIS, AND THOMAS BRENNAN, JR., OF ST. LOUIS PARK, MINNESOTA, ASSIGNORS TO MONITOR DRILL COMPANY, A CORPORATION OF MINNESOTA.

GRAIN-DRILL.

1,061,517. Specification of Letters Patent. Patented May 13, 1913.

Application filed May 16, 1910. Serial No. 561,572.

*To all whom it may concern:*

Be it known that we, EDWIN R. BEEMAN and THOMAS BRENNAN, Jr., of Minneapolis and St. Louis Park, respectively, in the county of Hennepin and State of Minnesota, have invented a new and useful Improvement in Grain-Drills, of which the following is a specification.

This invention relates to grain drills of the type in which the furrows to receive the seed, are formed by opening disks, and in which the seed is directed into the furrows by seed tubes or boots, mounted with their delivery ends adjacent the sides of the disks.

The invention has special reference to the mounting of the seed tube or boot, relative to the disk, and consists mainly in so sustaining the seed tube that its delivery end will be held yieldingly against the side of the disk, whereby the tube will maintain the same relation to the disk's surface, notwithstanding any irregularity in the same or any unevenness in its rotation.

In the accompanying drawings: Figure 1 is a side elevation of a disk opener and seed tube or boot embodying our invention. Fig. 2 is a vertical sectional elevation on the line *a—a* of Fig. 1. Fig. 3 is an elevation of the disk and boot as viewed from the side opposite that shown in Fig. 1. Fig. 4 is a section on the line *b—b* of Fig. 3. Fig. 5 is a perspective view of the confining cap for the scraper blade. Fig. 6 is an elevation of the central portion of the disk, and the end of the disk supporting head. Fig. 7 is a perspective view of the delivery end of the seed tube and a portion of the disk with which it contacts.

Referring to the drawings: 1 represents an opening disk mounted to rotate on a frame 2, which in the present instance is in the form of a supporting arm 3 extending upwardly and rearwardly from the disk's axis, and provided with an extension 4 forward of the disk's axis, to which extension a drag-bar 5, shown by dotted lines in Fig. 1, is adapted to be connected. These disks are usually mounted in gang in the seeding machine, the drag-bars being connected at their forward ends with the machine frame so as to apply the necessary draft to the parts, and the disks being so connected with their carrying frames that they extend at an angle with respect to the line of travel.

The disk supporting arm 3 has connected with it near its upper end an upright seed tube 6, the upper end of which is adapted to receive the seed to be planted, while the lower delivery end is arranged alongside of and in contact with the convex face of the disk near its rear edge, whereby the seed from the delivery end of the tube will enter the furrow as it is formed by the disk.

It is important, for the proper and effective deposit of the seed with certainty in the furrow, that the delivery end of the tube maintain close contact with the side of the disk, and in order that this result may be accomplished, notwithstanding any irregularity or unevenness that may exist in the form and surface of the disk or its rotation, we propose to so connect the seed tube with its supporting frame or arm, that it may move at its lower end transversely of the plane of the disk, and in connection with the tube so mounted, we provide suitable means for holding its delivery end in yielding contact with the disk. The preferred construction by which this action is brought about consists in the pivoting of the seed tube near its upper end, to the arm 3 on a fore and aft axis, as at 10, and the interposition between the arm and tube, above this axis, of a spring 11, the result being that the spring will tend by its expansion to force the upper end of the tube away from the arm and urge its lower delivery end toward and in yielding contact with the disk. As shown in the drawings, the pivotal axis is formed by a removable pin 13 extending through the walls of a vertical socket 14 in the arm and through a lug 15 projecting laterally from the seed tube and seated in the socket. The spring 11 is of spiral form, and applied between the tube and arm, with one end bearing in a depression 16 in the side of the tube, and the coils of the spring engaged by two opposing lugs 17 projecting inwardly from an opening 18 in the arm. By turning the spring around with a screwing motion, the coil will screw past the lugs and be compressed in between the arm and tube, with the result that more pressure may be brought against the upper end of the tube, and its lower end caused to bear with greater force against the side of the disk. By turning the spring in the opposite direction, the compression of the coils will be relieved, and the pressure of the end of the tube against the disk correspondingly decreased.

By means of the construction described, it will be seen that the delivery end of the tube by being maintained constantly in close contact with the disk's surface, will cause the seed to be delivered with uniformity and certainty in the furrow and without danger of being thrown out of the furrow, as might occur if the disk did not revolve in a uniform path, or if irregularities existed in its surface. Furthermore, the close contact of the end of the tube with the disk, obviates the liability of any soil or rubbish working in between the two parts and the consequent imperfect delivery of the seed. In order that the opposite side of the disk, that is, the convex side, may be kept free of adhering soil, we provide a radially arranged scraper blade 30, which is confined at its inner end at the disk's axis and extends therefrom outwardly toward the edge, so as to subject the entire surface of the disk to a scraping action as the disk revolves relatively to the blade. This blade is so confined at its inner end that it may move at its active edge to and from the disk, and it is held yieldingly against the face of the disk in order that it will always maintain close contact therewith without regard to any irregularities in the face of the disk or any unevenness in its rotation. We show in Fig. 4 a convenient means for accomplishing this result, in which figure it will be seen that the disk is mounted to rotate freely on a supporting head 31, extending through a central opening in the disk and provided on one end, at the concave side of the disk, with a squared extension 32, seated in a corresponding socket in the end of the arm 3 and fixedly held therein, as will be presently described. On its other end, at the convex side of the disk, the head is provided with an extension 33, formed with an annular recess 34 extending partially around the same. The scraper blade 30 is seated at its inner end against the flat end of the extension 33 and is acted on by a spiral spring 35 compressed beneath a cap 36 recessed at one side to straddle the blade and having its edge seated in the annular recess 34, a clamping bolt 36 being extended through the arm, the head, the blade and the cap, and serving to clamp said parts together with the head securely fixed to the arm. The spring 35 by bearing on the end of the blade, acts to hold the same flatly at its active edge, and yieldingly against the face of the disk, the depth of the recess in the cap being such that the blade is permitted to move on the confining bolt, to and from the disk to a limited extent subject to the restraining action of the spring.

While in the accompanying drawings we have shown our invention as embodied in the form which we prefer to adopt, and which form has been found in practice to answer to a satisfactory degree the ends to be attained, it will be understood that the invention is not limited to any particular details except in so far as such limitations are specified in the claims.

Having thus described our invention, what we claim is:—

1. In a grain drill and in combination with a rotary opening disk, a seed tube having its toe in direct contact with the disk and movable bodily, transversely with reference to the plane of the disk about a fore and aft axis, and means for maintaining the toe in yielding engagement with the disk.

2. In combination with the supporting arm, an opening disk mounted thereon, a seed tube mounted on said arm on an axis parallel or substantially so with the plane of the disk and adapted to engage the disk below said axis; whereby the lower end of the tube is movable to and from the disk, and a spring engaging the arm and tube above said axis and acting to hold the lower end of the tube in yielding engagement with the disk.

3. In combination with the supporting arm provided with a socket, a disk mounted on the arm, a seed tube formed with a lug seated in the socket, a device confining the lug pivotally in said socket, and a spring between the arm and tube acting to hold the latter yieldingly against the disk.

In testimony whereof we hereunto set our hands this sixth day of May, 1910, in the presence of two attesting witnesses.

EDWIN R. BEEMAN.
THOMAS BRENNAN, Jr.

Witnesses:
 A. R. TARBOX,
 A. B. ALLEN.

---

Copies of this patent may be obtained for five cents each, by addressing the "Commissioner of Patents, Washington, D. C."